Sept. 1, 1964 W. E. GLENN, JR 3,147,062

MEDIUM FOR RECORDING

Original Filed Feb. 15, 1960

5 Sheets-Sheet 1

Inventor:
William E. Glenn, Jr.,
by Richard R. Brainard
His Attorney.

Inventor:
William E. Glenn, Jr.,
by Richard R. Brainard
His Attorney.

Sept. 1, 1964 W. E. GLENN, JR 3,147,062

MEDIUM FOR RECORDING

Original Filed Feb. 15, 1960 5 Sheets-Sheet 3

Inventor :
William E. Glenn, Jr.,
by Richard R. Brainard
His Attorney.

Sept. 1, 1964

W. E. GLENN, JR 3,147,062

MEDIUM FOR RECORDING

Original Filed Feb. 15, 1960

5 Sheets-Sheet 4

Inventor:
William E. Glenn, Jr., by Richard R. Brainard
His Attorney

Inventor:
William E. Glenn Jr.,
by Richard R. Brainard
His Attorney.

United States Patent Office 3,147,062

Patented Sept. 1, 1964

3,147,062
MEDIUM FOR RECORDING

William E. Glenn, Jr., Scotia, N.Y., assignor to General Electric Company, a corporation of New York Original application Feb. 15, 1960, Ser. No. 8,842, now Patent No. 3,113,179, dated Dec. 3, 1963. Divided and this application Jan. 23, 1961, Ser. No. 84,424
12 Claims. (Cl. 346—77)

Figures 1, 3:
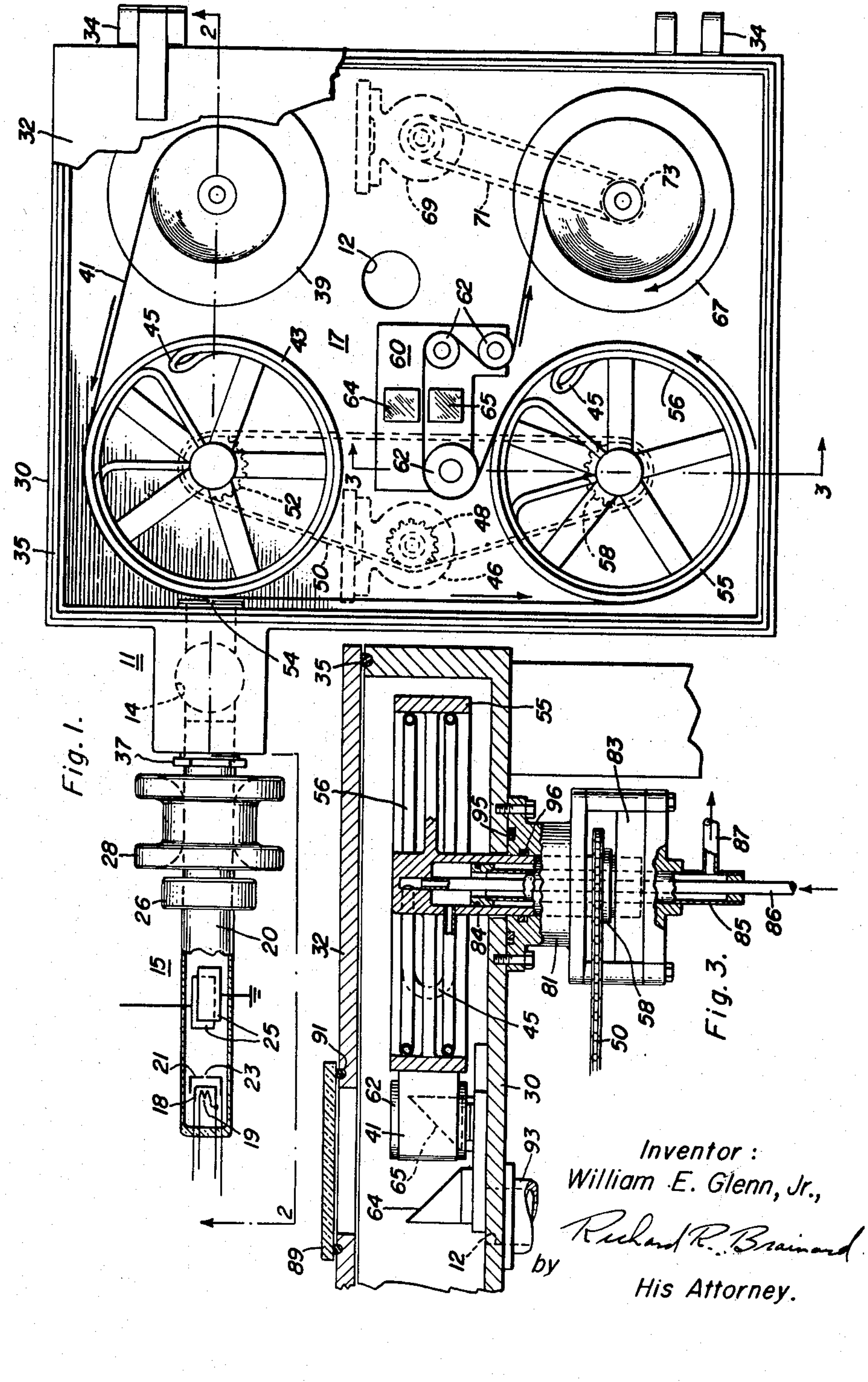

The present invention relates to an improved recording medium and more particularly to an improved medium for recording information by deformation of a thermoplastic layer of the medium. The present application is a division of my application Serial No. 8,842, filed February 15, 1960 (now Patent No. 3,113,179, granted December 3, 1963), entitled "Method and Apparatus for Recording" and assigned to the assignee of this application. My aforementioned application Serial No. 8,842 is a continuation-in-part of my copending application Serial No. 698,167, filed November 22, 1957, now abandoned, and my copending application Serial No. 783,594, filed December 29, 1958, now abandoned, which is also a continuation-in-part of application Serial No. 698,167.

The rapidly expanding use of information handling equipment and the practice of recording on tape of television programs are indicative of the need for high capacity, high fidelity, versatile recording and read-out or playback equipment. Magnetic tape recording is a type of recording that has found widespread use. Certain disadvantages and limitations of magnetic recording are known and these include the requirement of equipment for play-back comparable in complexity to the recording equipment, difficulty of monitoring the recording, and little opportunity for increasing presently attained information storage densities.

Photographic recording is another type of recording that has been used, but which is also subject to certain serious limitations and disadvantages. Much information to be recorded is contained in electrical signals and photographic recording requires a conversion of these signals before recording. Also, development of the stored information is a wet process, involving substantial time and erasure of the information and re-use of the film are not feasible.

In accordance with the present invention, I provide a new medium for recording information which is particularly suited for recording information contained in electrical signals, which has advantages over known types of recording. It is characterized by very high storage density capabilities, rapid development, direct optical read-out with relatively simple equipment, ease of monitoring the recording and ease of erasure and reuse of the recording medium.

Accordingly, it is an important object of the present invention to provide an improved medium for recording information, particularly information contained in electrical signals.

It is another object of the present invention to provide an improved recording medium having high storage density capabilities.

Another object of the present invention is to provide an improved medium for information recording from which optical read-out of the recorded information is readily accomplished.

Another object of the present invention is to provide a recording medium for storing information contained in electrical signals that is available for read-out immediately after the recording.

It is another object of the present invention to provide an information recording medium, the temperature of which is raised to permit the deformation thereof in accordance with the information and on which the information is preserved by restoring the temperature of the medium to a lower value.

It is another object of the present invention to provide an improved recording medium utilizing a thermoplastic recording surface.

It is another object of the present invention to provide improved recording medium having a thermoplastic recording surface with improved means for heating the recording surface to a liquid state.

These and other objects are achieved in one form of my invention by utilizing a recording medium having a thermoplastic layer which is converted into a liquid state to permit deformation thereof in accordance with a charge pattern on the surface corresponding to the information to be stored. The charge pattern may be established by an electron beam controlled in accordance with the information to be recorded and the electrons deposited, and any secondary electrons resulting therefrom, are attracted by electrostatic forces toward the backside of the film to produce depressions on the liquid surface, the depth of which depends upon the number of electrons or charge density at the respective points of the liquid surface. Finally, the surface of the film is cooled, or allowed to cool to a substantially solid state to preserve the depressions therein.

The heating of the film to permit the deformations to occur in accordance with the electron charge pattern may take place either before or after the charge pattern is deposited and the charge pattern is retained for long periods of time, so that it may be heated in air after the film is removed from the chamber in which it is subjected to the beam. In another embodiment the temperature of the thermoplastic is raised by resistance heating of a thin conductive film incorporated in a composite film structure including a base layer, a thin transparent conductive layer and a layer of thermoplastic material. The heating energy is, in a specific embodiment, provided by a source of high frequency electrical energy coupled to the conductive layer.

The information stored in the form of ripples or depressions in the recording medium may be read out by projecting light through a masking system which blocks the light transmitted through the undeformed medium and transmits light which is diffracted or refracted by the deformations. If the deformations correspond to super-imposed diffraction gratings, each containing the color information for one color of a color television scene, the color picture may be projected by a masking system which blocks the zero order diffracted light and passes largely first order diffracted light. Such a masking system which cooperates with the type of deformations just described is described and claimed in connection with a liquid light modulating medium in my Patent No. 2,813,146, dated November 12, 1957.

Figures 2, 4, 5:
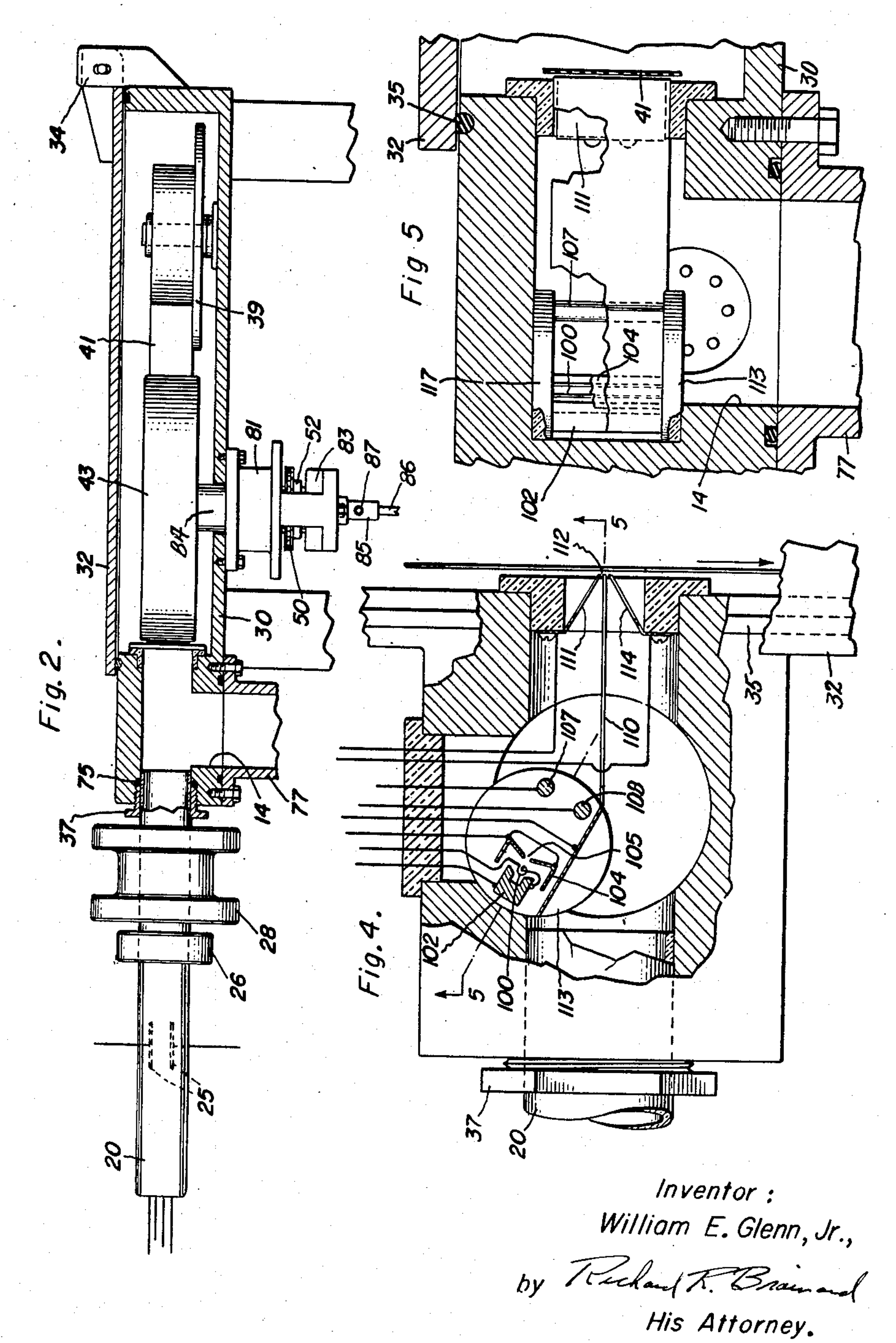
Figure 6:
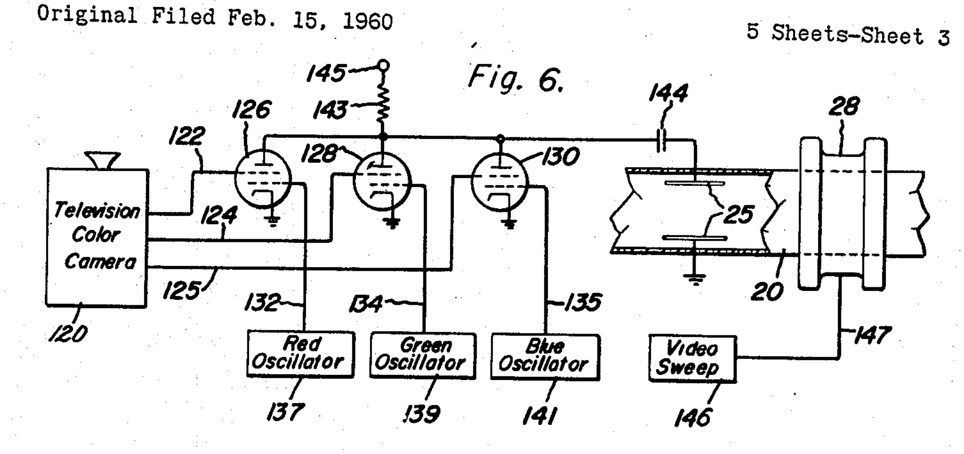
Figures 7, 8:
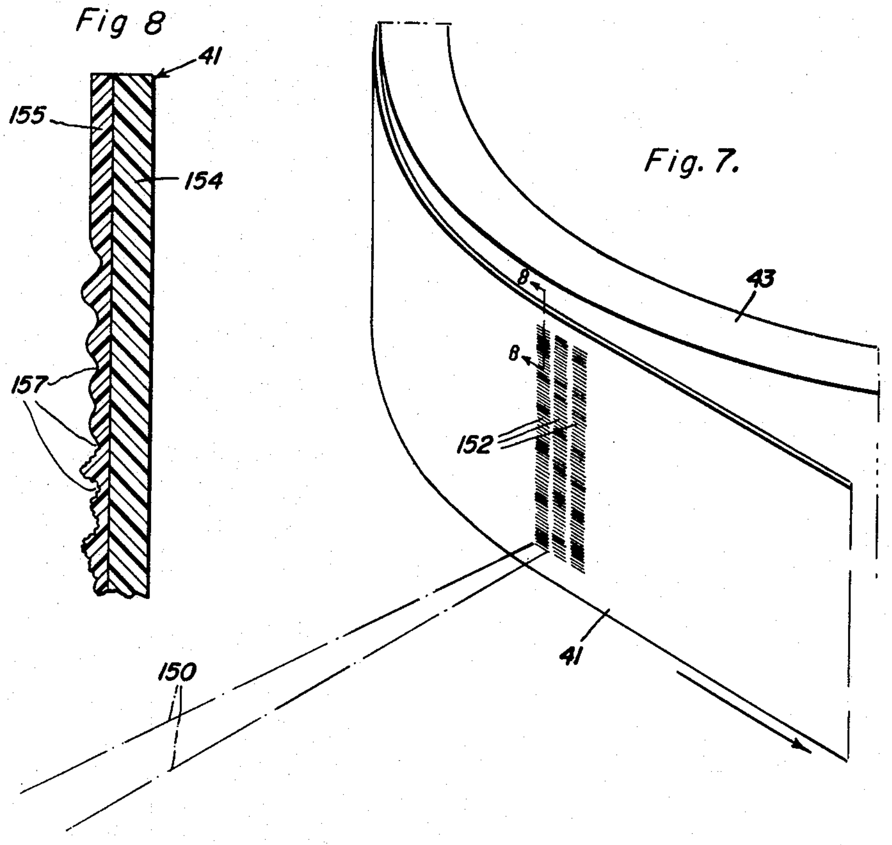
Figures 9, 10, 11:
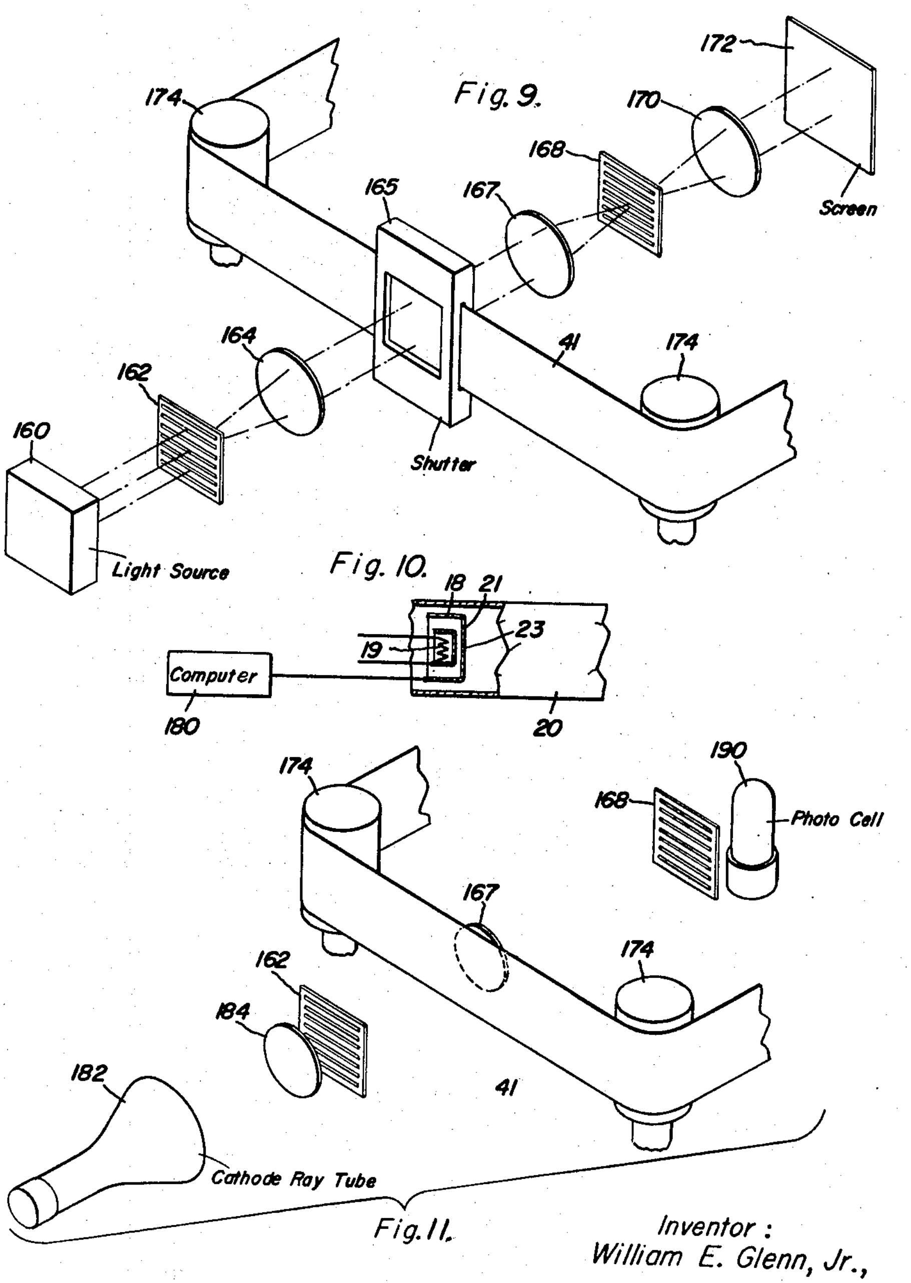
Figures 12, 13, 14, 15, 16:
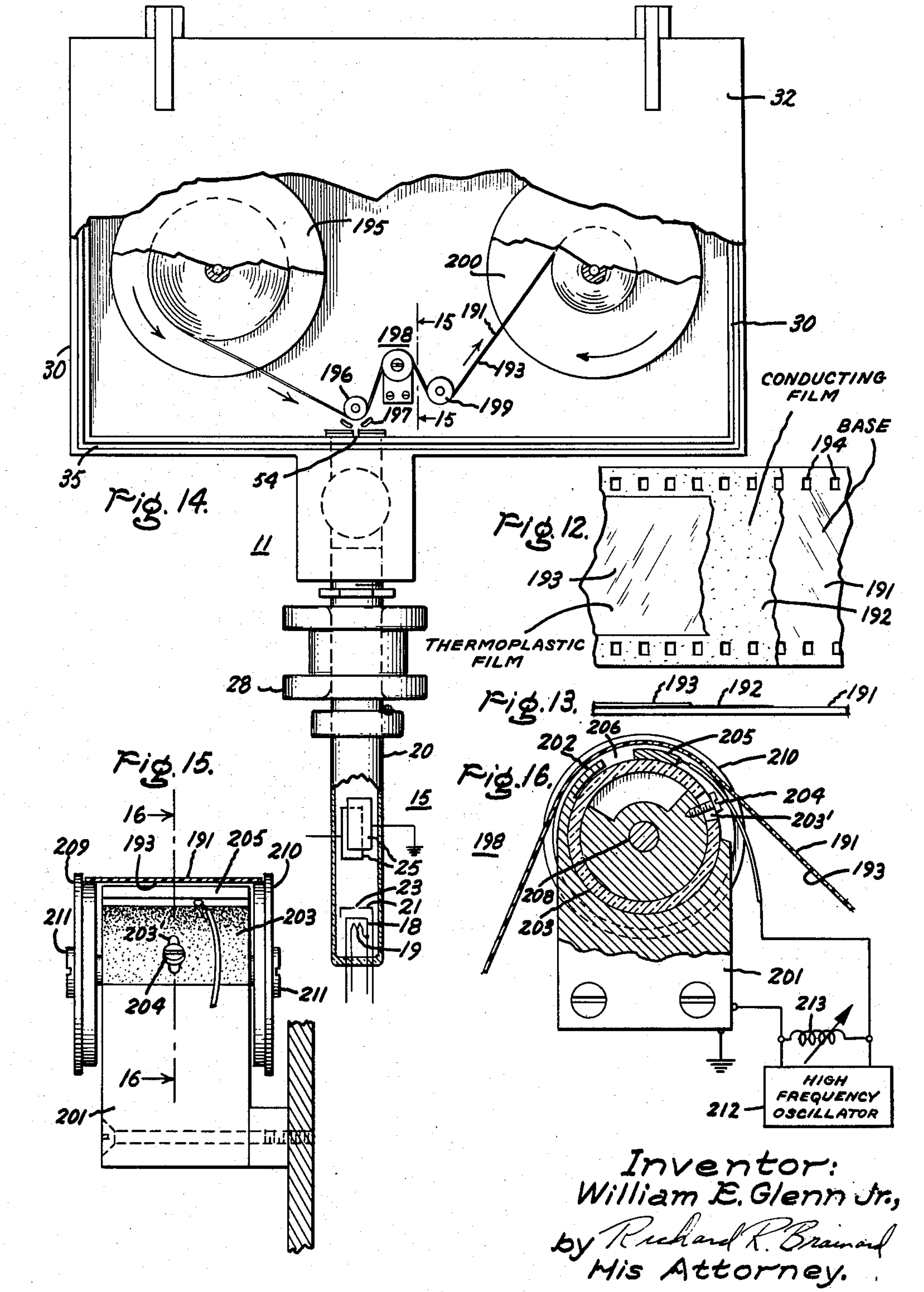

The novel features that I believe are characteristic of my invention are set forth in the appended claims. However, my invention, itself, together with further objects and advantages thereof may best be understood by reference to the following description taken in connection with the accompanying drawings, in which:

FIGURE 1 is a top plan view, partly in section, of one embodiment of my invention, FIGURE 2 is a cross-sectional view taken along the lines 2—2 of FIGURE 1, FIGURE 3 is a partial cross-section taken along the lines 3—3 of FIGURE 1, FIGURE 4 is a top plan view, partly in section, of a portion of another embodiment of my invention, FIGURE 5 is a cross-sectional view taken along the lines 5—5 of FIGURE 4, FIGURE 6 is a diagrammatic illustration of suitable circuits for connecting the output color signals from a television color camera to the input elements of an embodiment of the present invention, FIGURE 7 is a perspective view of film upon which color television information has been recorded, FIGURE 8 is a partial cross-sectional view of the film in FIGURE 7 taken along the lines 8—8, FIGURE 9 is one optical system suitable for viewing color television signals recorded on film by an embodiment of the present invention, FIGURE 10 is a schematic illustration of suitable circuits for connecting the output signals from a computer to the input elements of an embodiment of the present invention, FIGURE 11 is a schematic illustration of an optical system suitable for recording computer information recorded on tape by an embodiment of the present invention, FIGURE 12 is a plan view of a three layer recording medium embodying my invention, FIGURE 13 is an elevational view of the tape shown in FIGURE 12, FIGURE 14 is a plan view partially broken away of recording apparatus embodying my invention and including a high frequency heater for developing the tape shown in FIGURES 12 and 13, FIGURE 15 is a sectional view taken along the line 15—15 of FIGURE 14, and FIGURE 16 is a sectional view taken along the line 16—16 of FIGURE 15, and both showing the details of the heater structure.

In the several figures of the drawing, corresponding elements have been indicated by corresponding reference numerals to facilitate comparison, and those circuit elements which may in themselves be entirely conventional and whose details form no part of the present invention have been indicated in simplified block form with appropriate legends.

Referring specifically to the figures, in FIGURE 1 a chamber 11 is substantially evacuated of gases and vapors by suitable equipment (not shown) operating on two exhaust ports 12 and 14. The left portion of this chamber comprises an electron beam assembly 15 in which an electron beam is generated, focussed, and deflected. The right portion comprises a film box assembly 17 in which a thermoplastic film is unwound, heated, subjected to the electron beam from assembly 15, cooled and then rewound.

In assembly 15 the means for impinging an electron beam on the thermoplastic film in box 17 is shown to be a cathode electrode 18 heated by a filament 19, both of which along with other elements of assembly 15, are enclosed in an envelope 20. An anode electrode 21, having a small rectangular hole 23 through which the electron beam passes, serves as a means for accelerating and modulating the electron beam in typical control electrode fashion. That is, the more positive anode electrode 21 is with respect to cathode electrode 18, the greater the number of electrons passing through hole 23 per unit of time. Consequently, input amplitude modulated electrical signals can be impressed upon the beam by applying them to anode electrode 21. This operation is not preferred, however, because a modulated beam is not always at maximum intensity and thus not at maximum effectiveness for producing depressions in the thermoplastic film in box 17. Therefore, the input electrical signals are preferably conducted instead to an auxiliary deflection means comprising two deflection electrodes illustrated as plates 25 wherein they, in conjunction with primary deflection structure described below, momentarily slow, speed, and even halt the deflection of the beam. Thus, the beam pauses at points on the film surface for times that are functions of the amplitude of this input electrical signal.

A solenoidal coil 26 mounted on envelope 20 magnetically focuses the electron beam to converge on the film in a small rectangular area which in one constructed embodiment was approximately 5 by ½ mils. Smaller beams with more nearly equal dimensions have been used, and these smaller beams, while requiring better focusing, make possible a greater density of information storage. A beam having dimensions of .16 mil by .25 mil has been used. Of course, electrostatic focusing can be used in lieu of or in conjunction with this magnetic focusing. The principal deflection means is illustrated as a saddle type deflection coil 28 mounted on envelope 20 but again electrostatic means can be used instead.

The operation of electron beam forming assembly 15 is quite similar to the operation of like structure in a television receiver with the principal exception that the beam in assembly 15 is scanned only over a line as contrasted to area scanning in a television tube. However, the same area coverage is produced because the film in assembly 17 is moved perpendicularly to the line of deflection. Another distinction relates to the deflection, which is not linear as in a television tube, but rather in steps or velocity variations when the input signal is applied to plates 25. But if the input signal is applied to anode electrode 23 instead, the scan may be linear.

Film box assembly 17 includes a box 30 having a cover 32 supported therefrom by hinges 34. A flexible molding 35 inserted around the top edge of box 30 produces an air seal when cover 32 is closed by compressing to fill any gaps that might otherwise be present. An air seal is produced between envelope 20 of assembly 15 and box 30 by packing nut 37 that upon rotation compresses suitable packing material, shown in a subsequent figure, which then tightly engages box 30 and envelope 20.

The recording medium of the present embodiment of the invention and itself forming an important part of my invention is in the form of a film 41 including a base having a thermoplastic surface layer. Before describing the manner in which the medium is subjected to the electron beam and heated to such a temperature that the surface is liquid, some of the requirements and suitable compositions for the tape will be described. When the tape is to be used in a light transmission type of projection system, it is essential that both layers be transparent. The base material should be optically clear, smooth, and solid at temperatures substantially above the temperature at which the thermoplastic surface becomes liquid. The thickness of the base material is not critical but should be much greater than the thickness of the thermoplastic surface layer. Excellent results have been obtained with the base strip of 4 mils thickness. One suitable material for the base is an optical grade of polyethylene terephthalate, sold under the name of Cronar. Mylar is also suitable. The thermoplastic layer of the film must also be optically clear, have resistance to irradiation, have a substantially infinite viscosity at temperatures to which the recording medium may be subjected when in storage. It also must become liquid at the temperature to which it is heated for development by the electrostatic forces due to the charges. By liquid is meant that the thermoplastic becomes sufficiently liquid readily to permit deformation by the electrostatic forces generated by the charge pattern. A desirable temperature range for materials to become liquid for developing is 60° C. to 150° C., although a higher temperature may be used. The materials should have a viscosity of about 4000 centipoises, for example, at the temperature to which it is to be heated, and it should have a resistivity above 3 times $10^{10}$ ohm centimeters at that temperature and in the thickness in which it is used as the recording medium. The resistivity of the material at the temperature to which it is heated for development by the electrostatic charges is important since, for a given set of conditions, such as dimensions and the like, it is determinative of the electrical time constant by which the charge pattern decays.

It is important that the charge pattern be maintained long enough for the deformation to take place as a result of the electrostatic forces before the charge decays and at the viscosity of the medium. One thermoplastic material satisfactorily meeting these requirements is the blend of polystyrene, m-terphenyl and a copolymer of 95 weight percent of butadiene and 5 weight percent styrene. Specifically, the composition may be 70 percent polystyrene, 28 percent m-terphenyl and 2 percent of the copolymer. The tape may be prepared by preparing a 10 percent solid solution of the blend in toluene and coating the base material with this solution. Toluene is evaporated by air drying and by pumping in vacuum to produce the final composite article. The thickness of the thermoplastic layer may vary from .01 mil to several mils with a preferred thickness being equal to or a little less than the distance between depressions in the film, which will be described below. For recording television pictures and with grating spacings of approximately 16 microns, the thickness of the thermoplastic film may be between 6 and 15 microns or in terms of mils, .25 and .6 mil, for example.

Another suitable thermoplastic layer may consist of a medium molecular weight polystyrene. This may be prepared by mixing powdered polystyrene of the types commercially available as PS1 and PS2 from the Dow Chemical Company. These powders are mixed in desired proportion which will, of course, determine the molecular weight of the finished product, in xylene and applied at room temperature. In a preferred example, the PS1 and PS2 polystyrene powder are mixed in equal amounts to provide a mixture which melts at about 110° C. The surface is heated with warm air above the melting point of the polystyrene mixture and allowed to cool in air.

In addition to the thermoplastic compositions and recording media described above, other thermoplastic compositions and recording media made therewith can be employed as, for example, those disclosed and claimed in the copending application of Edith M. Boldebuck, Serial No. 8,587, filed February 15, 1960 (now Patent No. 3,063,872, granted November 13, 1962) and assigned to the same assignee as the present invention. The aforesaid Boldebuck application discloses for the thermoplastic layer of the recording medium a composition of matter comprising a compatible mixture of (1) an organopolysiloxane and (2) an aryl polymer selected from the class consisting of (*a*) polyarylene ethers, (*b*) a polystyrene and (*c*) mixtures of a polyarylene ether and a polystyrene.

Among the organopolysiloxanes which can be employed are those having the general formula $$R_mSiO_{\frac{4-m}{2}}$$

where *m* is a value of from 1 to 2.01, R is a monovalent organic radical at least 40 percent of the said organic radicals being aryl radicals, the remaining radicals, if any, being selected from the class consisting of aryl, alkyl, haloaryl, alkaryl, and aralkyl radicals.

Various polyarylene ethers can be used and one which has been found especially suitable is composed of the repeating structural unit

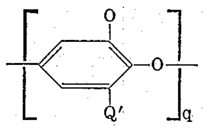

wherein the oxygen atom of one unit is connected to the benzene nucleus of the adjoining unit, *q* is a positive integer, Q is a monovalent substituent selected from the class consisting of hydrogen, halogen, aliphatic hydrocarbon radiacals free of a tertiary alpha-carbon atom, aralkyl, alkaryl, and aryl radicals, and Q′ is a monovalent substituent which is the same as Q and in addition may be a hydrocarbonoxy free of an aliphatic tertiary alpha-carbon atom. A specific example of such a polyphenylene ether is one composed of the recurring structural unit

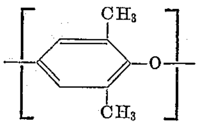

Examples of polystyrene material which may be employed are, for instance, polystyrene, poly-(p-chlorostyrene), etc. Mixtures of the organopolysiloxane with the polyphenylene ether and the polystyrene material can also be employed in making the optically clear thermoplastic layer deposited on the backing for the recording medium.

Many examples which R, Q, Q′, *m* and *q* represent, as well as examples of organopolysiloxanes and solid aryl polymers useful in the preparation of the aforesaid thermoplastic compositions for recording medium (e.g., tapes, slides, disks, etc.) are more particularly disclosed and claimed in the aforesaid Boldebuck application.

The illustrated means for heating and also for driving film 41 is a rotatable capstan 43, the surface of which is heated by the flow of a hot liquid or vapor, such as steam, in pipes 45 secured to the capstan interior. Heat from these pipes flows by conduction to the exterior surface and thence to the film 41, so that as the film contacts the outer surface of the capstan, successive portions of the film surface are heated to a liquid state. Capstan 43 is driven by a motor 46 (illustrated in dotted line form) which is located below box 30 and has a sprocket 48 for engaging a drive chain 50 that in turn engages a gear 52 on capstan 43.

Capstan 43 is positioned so that film 41 leaves it along a line approximately opposite an aperture 54. This aperture, although narrow and preferably only wide enough to pass the electron beam from assembly 15, has a length approximately equal to the width of film 41, thereby permitting deflection of the electron beam over approximately the total width of film 41. Aperture 54 permits the passage of the beam while preventing significant flowing of gases and vapors from the film box assembly 17 into the electron beam assembly 15. The interiors of these assemblies although substantially evacuated, require different pressures because of the differences in electron beam travel in the two assemblies. Since electrons have a long travel path through envelope 20, the pressure in it must be quite low to avoid scattering of the electron beam by collision of the electrons with gas and vapor molecules. On the other hand, the beam travel in box 30 is quite short, rendering the opportunities for collision the same, or perhaps even less than in envelope 20, even though the gases and vapors are denser. While the interior of box 30 may be kept at the low pressure required in envelope 20, this would necessitate an unnecessarily large vacuum pumping unit.

Film 41, after being subjected to bombardment by the electron beam, is driven by a cooling capstan 55, the surface of which is cooled by conduction from a coolant passing through pipes 56 connected to the capstan interior. This cooling converts the liquid surface of film 41 to a substantially solid state, thereby preserving the depressions therein produced by the electron beam. Capstan 55 is driven by driving chain 50 through a gear 58.

An optical system 60 for permitting an operator to ascertain if information has been impressed upon film 41 includes a plurality of idler pulleys 62 for directing film 41 between two mirrors 64 and 65 positioned at 45 degree angles with respect to the film to reflect light from the film upwards toward cover 32, where it passes through a window (not shown). From optical system 60 the film is wound on a storing reel 67, maintained under substantially constant torque by a motor 69 that acts upon a belt 71 engaging a pulley 73 on reel 67.

In FIGURE 2 certain structures are illustrated that were mentioned in the discussion of FIGURE 1, but not shown in that figure. A ring of packing 75 is shown against the inner end of packing nut 37 so that as this nut is rotated, it compresses the packing to engage envelope 20 and box 30 to produce an air-tight seal therebetween. A conduit 77 joined to port 14 provides a path for removing gases and vapors from envelope 20 by a vacuum pump (not shown).

Other structure in FIGURE 2 includes two bearings 81 and 83 for a shaft 84 that drives capstan 43, which shaft is made hollow to provide a passageway for steam to pipes 45 (shown in FIGURE 1). Within shaft 84 two concentric pipes 85 and 86 are coaxially positioned to provide inlet and outlet paths for the steam. Steam is directed into pipe 86 and up into the pipes 45. Then it travels down into the space between the inside of pipe 85 and the outside of pipe 86 to an outlet port 87.

In the cross-sectional view of FIGURE 3, some additional structure is illustrated. A circular cover glass 89 is situated over a hole in cover 32 directly over optical system 60, so that light reflected from either of the two mirrors 64 and 65 passes through this glass to an observer. Actually, light enters box 30 through this glass and reflects from one of the mirrors through the film 41 and then reflects from the other mirror back up through glass 89, thereby enabling an observer to ascertain if depressions are on the film. If required, a ring of molding 91 can be placed in cover 32 under glass 89 to ensure an air-tight seal between the glass and cover.

A hollow conduit 93 is connected to box 30 at port 12 to provide a path for the bases and vapors to flow from the box to an evacuating pump (not shown). As previously mentioned, the pressure in box 30 need not be as low as that in envelope 20.

The means for conducting the coolant to capstan 55 in FIGURE 3 are substantially identical to the means for conducting the heated fluid to capstan 43 in FIGURE 2 and so the same reference numerals are used to designate the respective parts in both figures. In addition to the previously described structure, packing 95 is shown between bearing 81 and the underside of box 30 to produce air-tight fit. For the same purpose packing 96 is placed between the exterior of drive shaft 84 and the inside of bearing 81.

In the operation of the embodiment of FIGURES 1–3, as film 41 is driven past capstan 43, the thermoplastic coating is heated to a liquid state by heat conducted from the capstan surface. Along a line approximately where film 41 leaves capstan 43, this molten thermoplastic coating is impinged by a signal electron beam from assembly 15, which beam is deflected widthwise over the film by a magnetic field from deflection yoke 28. The number of electrons striking any one point of the film depends upon the deflection speed and also the number of electrons in the beam, thus either of these quantities or both can be modulated with the input electrical signal. Since a high intensity beam is generally desired, the beam is usually modulated by the application of the input voltage to deflection plates 25. Then the deflection speed of the beam across any point of the film is a function of the instantaneous magnitude of this input voltage. Consequently, the number of electrons impinging any one point of the film is a function of this same voltage. The resulting electrons on the film surface are electrostatically attracted toward the film base to produce minute depressions in the liquid surface, the depths of which depend upon the number of electrons at any one point. The attraction is between the electrons and the ground plane provided by the capstan 43, which is maintained at ground potential along with the rest of the film enclosure. Thus, the depths of the depressions are a function of the amplitude of input voltage applied to plates 25. In other words, the thermoplastic layer undergoes a pattern of thickness deformation corresponding to the charge pattern on the surface thereof. As will be described in more detail at a later point in the specications, these deformations are effective to refract or diffract light emanating from the surface of the thermoplastic, so that the recorded information may be read out by an optical system, including masking means for blocking the unrefracted or undiffracted light corresponding to undeformed areas of the thermoplastic. These depressions would be smoothed out and lost when the film is rewound if it were not for the subsequent cooling of the liquid surface to a substantially solid state by cooling capstan 55. After the film has been cooled, it is rewound on reel 67 and immediately is available for use.

In FIGURE 4 an alternative system is illustrated for heating the surface of film 41 to a liquid state, which system eliminates the need for heating and cooling capstans 43 and 55, although one or both of these capstans may be included for driving the film. In this system in which the film surface is heated by electron bombardment, a longitudinally extending filament 100, which comprises a source of bombarding electrons, is positioned within the effective region of a beam focusing electrode 102 that bunches the radially emitted electrons into the form of a sheet. The resulting beam is accelerated by an anode electrode 104 having a rectangular aperture 105 therein suited for the passage of the beam. The beam then passes between focusing and deflection electrodes 107 and 108 that cause it to be more sheet-like and that also direct it toward film 41. Further focusing is provided by an axially extending shield 110 in conjunction with a focus electrode 111 immediately before the bombarding electron beam passes through an aperture 112 to strike film 41. A circular insulator 113 permits the mounting of the beam forming and focusing structure to extend over hole 14. The structure for forming the signal electron beam can be the same as that previously mentioned in the discussion of the embodiment of FIGURES 1–3. However, it may be advisable to insert an electrode 114 to act in conjunction with shield 110 for additional focusing of the signal electron beam.

In the cross-sectional view of FIGURE 5, the width of the bombardment electron beam forming structure is seen to be approximately equal to the width of film 41 so that it can produce a bombarding electron beam extending along the width of the film. While conceivably a much narrower beam may be used, this would require the insertion of circuits for deflecting the bombarding electron beam over the width of the film in synchronism with the deflection of the signal electron beam, so that the latter beam is always incident upon a liquid surface. This may be impractical because a relatively small current of only a few milliamperes is required to heat the whole surface width, and consequently it may be less expensive to provide structure for simultaneously heating the whole width. FIGURE 5 additionally shows a circular insulator 117 which functions with insulator 113 to mount the bombarding electron beam forming and focusing structure.

When the surface of film 41 is heated by bombardment, a cooling means such as capstan 55 is not required since the film base withdraws sufficient heat to cool the surface to a substantially solid state. The base film cannot do this in the embodiment of FIGURES 1–3 because it too is heated by capstan 43 and acts as a partial heat reservoir for the surface coating rather than as a cooling means. Thus, when the heating system of FIGURES 4 and 5 is utilized, capstan 55 can be eliminated. Capstan 43, which would then be included only for maintaining a constant film speed may be maintained at a relatively cool temperature.

Another advantage of the embodiment of FIGURE 4 is that it can be used with recording materials other than tape or film. Since the recording materials used with the embodiment of FIGURE 1 must be capable of winding past capstans 43 and 55, they must be film-like. Since in the embodiment of FIGURE 4, one or both of these capstans are not included, the recording material must merely successively present different surface portions to the bombardment and signal electron beams. Accordingly, the recording material may be a disk, a cylinder, a sheet, etc.

FIGURE 6 diagrammatically illustrates one circuit suitable for use with either of the two disclosed embodiments for modulating the electron beam with a color television signal. A color television camera 120 produces three output voltages that are respective functions of the red, green and blue content of the scene being televised. The red, green, and blue output voltages are conducted, respectively, by leads 122, 124 and 125 to respective screen grid electrodes of three electron tubes 126, 128, and 130, the control grids of which are connected, respectively, by leads 132, 134, and 135 to respective oscillators 137, 139 and 141, which operate at different frequencies that for one constructed embodiment were 14, 17, and 20 megacycles, respectively. The anodes or plates of the three electron tubes are connected through a common anode resistor 143 to a terminal 145 to which a source of B+ voltage may be connected. The red, green, and blue output voltages from camera 120 operating through the respective electron tubes 126, 128, and 130 control the signals of the frequencies of the three oscillators generated across resistor 143, which signals are coupled by a unidirectional voltage blocking capacitor 144 to the auxiliary deflection plates 25. The principal deflection current is provided by a video sweep oscillator 146 operating at the television horizontal sweep rate and which energizes yoke 28 through lead 147.

Referring more specifically to the operation of the system of FIGURE 6, when there is a large red content in the output voltage from camera 120, a large signal is applied to the screen grid electrode of electron tube 126 thereby enabling a stronger signal of that frequency generated by oscillator 137 to appear across resistor 143 and thus be applied to deflection plates 25. This voltage on plates 25 varies the deflection of the electron beam at a rate equal to the frequency of this voltage. When the sweep is slowed down more electrons are concentrated on the film surface than when the sweep is speeded up, and thus each slowing down causes a depression in the film surface. These depressions are spaced a distance apart that depends upon the average deflection rate of the signal electron beam and the frequency of the varying signal applied to plates 25. The frequency of the oscillator 137 is so selected that the distances between depressions caused by a signal with its frequency are such that when this film is placed in an optical system to be described in a subsequent figure, white light shining through it is phase defracted an amount sufficient to produce a red point on a viewing screen. Similarly, voltages of the frequency of oscillator 139 developed across resistor 143 produce depressions in the film that are spaced to cause white light to diffract to produce a green point, and voltages having the frequency of oscillator 141 produce depressions on the film that diffract to produce a blue color. From the above it is seen that the distance between depressions on the film is a function of the color components and the depths of the depressions are functions of the intensity of the corresponding color components so that white light projected through the film and through a suitable light masking system conveys both the intensity variations and color selections to a projection screen in point-by-point correspondence with the television scene. The control of the electron beam described above for recording color television signals is described in connection with a liquid light modulating medium in a television projection system in my Patent No. 2,813,146, granted November 12, 1957. The manner in which the deformations cooperate with a light masking system to select the color components and intensities of those components in point-by-point correspondence with the televised scene is also described in detail in my aforementioned patent.

While in the above description three electrical color intelligence signals are employed to produce the diffraction patterns, in accordance with my invention described and claimed in my copending application, Serial No. 688,597, filed October 7, 1957, entitled "Color Information Presenting System," and assigned to the assignee of the present invention, two of the color signals may be electrically combined to provide what may be considered a variable color signal that has a frequency which varies in accordance with the ratio of the intensities of two of the color components, for example, the blue and green components, and an amplitude which varies with the sum of the intensities of these color components. To obtain this variable color signal the blue and green components are electrically added and the resultant signal conducted to one control electrode of a mixer electron discharge device. Simultaneously, another control electrode is energized by a variable frequency oscillator that produces a signal, the frequency of which varies as a function of a constant plus the logarithm of the intensity of the blue signal divided by the intensity of the green signal. The output signal from the mixer electron discharge device is then the desired variable color signal which, with the red component may be conducted to auxiliary deflection plates 25.

FIGURE 7 illustrates patterns produced on film 41 by a signal electron beam 150 shown at the bottom of a column 152 of depressions, illustrated as short lines, which have previously been formed by electrons from beam 150. While the columns 152 are shown separated, they may overlap slightly and preferably are just touching each other. It should be noted that the long sides of the depressions are parallel with the film edges.

As seen in the cross-sectional view of FIGURE 8, film 41 comprises a base film 154 coated with a thermoplastic surface 155. Depressions 157 formed in the surface by the signal electron beam are in some places irregular due to the presence of several colors, and in other places are sinusoidal in shape indicating the presence of only one color.

In my aforementioned Patent No. 2,813,146, dated November 12, 1957, an optical system is described in detail for projecting light through a liquid light modulating medium and such a system is suitable for projecting light through film 41 to reproduce an image corresponding point-by-point with the video color information on the film. Such an optical system is illustrated schematically in FIGURE 9 of the drawings in which a source of white light 160 produces a light beam that passes through the openings of a bar and slit system 162, through a lens system 164, through the film 41 at times determined by a shutter 165, through a second lens system 167, and selectively through a second bar and slit system 168 cooperating with the bar and slit system 162 to pass the first order diffraction patterns and mask or block zero order diffraction patterns. Light passing through the slits of the system 168 is projected by a lens system 170 on a projection screen 172 to reproduce the images of the patterns on film 41. When there are no depressions on film 41, the lens systems 164 and 167 project the image of the slits of bar system 162 onto the bars of system 168 so that no light from source 160 passes through lens system 170 to the projection screen 172. When there are depressions, the light from source 160 passes through the slits of bar system 162 and is diffracted by the depressions and elevations between depressions so that it passes through the slits of bar system 168 and is projected on screen 172. Thus, this diffraction produces a color picture on screen 172 similar to the televised scene the information of which was impressed upon film 41. Of course, as the optical system is shown the picture would be on its side, i.e., in a practical system the film 41 is run in a vertical direction as in a movie projector, and the optical system rotated 90 degrees.

Although the design of the optical system including the bar and slit system 162 and 168, should be readily apparent to those skilled in the art, it is believed desirable to mention that the design of the bar and slit system involves a compromise between such factors as light intensity, resolution and color purity. From the standpoint of light available at the screen and diffraction at the edges of the slits, the slits in both systems 162 and 168 should be made as wide as possible. The larger these slits are the better the resolution will be. On the other hand, the color purity or, in other words, the color selecting properties of the light masking system, deteriorate as these slits increase in width. Thus a compromise must be made in the construction of the masking system.

Due to the presence of the bars in the bar and slit systems 162 and 168, the resolution of the system in the horizontal direction (as viewed in FIGURE 9) is much better than in the vertical direction. For an undistorted picture, the resolution should be approximately the same in all directions. To achieve this result, beam 150 is formed in the shape of a rectangle whose long side is in the horizontal direction and whose length is the smallest dimension on the film that provides discernible points on screen 170. In one constructed system it was found that the smallest unblurred points of the image on the screen 172 correspond in a vertical direction to five of the depressions 157. In order to provide the same resolution in the horizontal direction as in the vertical, the length of these depressions (which is equal to the horizontal dimension of the electron beam as viewed in FIGURE 7) was made equal to the distance of five of these depressions, which for the constructed embodiment was approximately five mils. If the length of these depressions had been smaller, the picture element on the screen would have had better resolution in the horizontal direction than in the vertical direction.

When the present invention is utilized for the recording of computer information, the deflection speed may be varied. Alternatively, a linear deflection speed may be applied to the signal electron beam and the computer information readily inserted through modulation of the beam intensity by the connection of the output of a computer such as computer 180, shown in FIGURE 10, to the screen grid 21. Then the beam intensity and thus the electrons striking the film surface at the points thereof vary with the magnitude of the output voltage from computer 180.

The optical system for converting the recorded computer information back into electrical form may be a Schlerin slit system or the system illustrated in FIGURE 11. In this figure a flying spot scanner produces a spot of light that is swept back and forth along a line at the same rate that the electron beam was swept in producing the depressions on the film. This flying spot which is produced by a cathode ray tube 182, is focused by a lens system 184 through bar and slit system 162 on film 41 to move the spot widthwide over the film. A lens system 167 is interposed adjacent film 41 to project the slits of bar system 162 on the bars of bar system 168 as previously explained. If there are depressions on film 41 the light is diffracted or refracted through the slits of system 168 to strike a photocell 190 that converts the light pulses into electrical pulses similar to the electrical signal that was utilized to impress the computer information on film 41.

In accordance with an important and presently preferred embodiment of my invention a thin transparent conducting film is provided between the plastic base and the thermoplastic layer in which the deformations are formed. Such a recording medium makes possible certain simplifications in the apparatus and improvements in the heating of the thermoplastic layer to a liquid state and in the effectiveness of the charge pattern in producing the deformations. Such a composite tape is illustrated in FIGURES 12 and 13 in which a base 191 is preferably, as in the previous examples, optically clear and smooth and may be an optical grade of polyethylene terephthalate available under the trade name Cronar. The base layer is the least critical of the three layers of the tape. A thin transparent conducting coating or layer 192 is applied over the base layer 191. This coating may be formed of a number of materials in accordance with the known processes. A copper iodide film may be formed by evaporating copper onto the base and then passing the coated base through a solution of iodine in alcohol. The conducting coating is controlled in thickness so that it exhibits a resistance of about 1000 ohms per square. In the case of the copper iodide coating just described, a coating of 150 to 300 Angstroms thick is suitable. As an alternative transparent conducting layer, a very thin layer of chromium may be vacuum evaporated onto the film base 191. With such a conducting film a thickness of approximately 35 Angstroms provides a resistance of 1000 ohms per square. The thickness of the conducting layer determines the resistance and likewise tends to determine the transparency. Accordingly, the thickness may be controlled to obtain an optimum balance of these two factors. The thermoplastic layer 193 may be any of the thermoplastic materials previously described. The thickness of the thermoplastic layer is, as described earlier, preferably in the range of .01 mil to several mils and is preferably equal to or less than the distance between adjacent depressions in the film which it is deformed by the charge pattern. The film is preferably provided with openings 194 on the side edges thereof for engaging the drive and guide sprockets of the apparatus in which it is used. In the application of conducting coating 192 it extends to the edge of the tape while the thermoplastic coating stops short of the edge. In this way the conducting film provides for grounding of the conducting layer of the tape as it is used and thus maintains it at a definite potential which is desirable in its function of attracting to electric charges of the charge pattern on the thermoplastic surface layer to effect the thickness deformation thereof.

In a specific example of a three layer composite tape that has been used successfully the base is a layer, 4 mils thick, of an optical grade of polyethylene terephthalate (Cronar) on which a conductive film of chromium is vacuum evaporated to a thickness of approximately 35 Angstroms. This layer has a resistance of approximately 1000 ohms per square. The thermoplastic layer is about 7 microns or .32 mil thick and of the medium molecular weight polystyrene described previously as prepared from equal parts of PS1 and PS2, available from Dow Chemical Company. PS1 polystyrene has a molecular weight of about 2000 (extrapolated from manufacturer's data) and PS2 has a molecular weight of about 16,500 (measured by osmotic pressure in chloroform). By medium molecular weight is meant a molecular weight in the range 10,000–25,000. This thermoplastic has a resistivity substantially above the minimum of $3\times10^{10}$ ohm centimeters.

In FIGURES 14, 15 and 16 is illustrated an electronic recorder for utilizing the composite tape of FIGURES 12 and 13 and providing for high frequency heating of the film to develop the deformations of the thermoplastic layer. The electron gun and enclosure for the tape are, in general, the same as that illustrated in FIGURE 1 and corresponding parts have been designated by the same reference numerals and the detailed description thereof will not be repeated here. The structure for high frequency heating of the tape including the conducting film will be described in detail. The equipment within the evacuated enclosure 30 is considerably simplified over that illustrated in FIGURE 1 in that the heating and cooling capstans are eliminated. A supply of the three layer film is provided by reel 195 with the film passed over a roller 196 opposite the aperture 54 through which the electron beam passes. Spaced rod-like conductors 197 supported from the bottom of the enclosure on opposite sides of the beam and closely adjacent the film are at ground potential and tend to shield the beam from the charge on the film. The thermoplastic surface 193 faces toward the beam as it passes aperture 54 and this same surface layer faces the high frequency heater assembly designated generally by the numeral 198. This assembly will be described in detail in connection with FIGURES 15 and 16. The tape continues over guide roller 199 to take-up reel 200. The drive for the supply and take-up reels and the drive sprockets have not been shown since suitable drive mechanisms for films are well known in the art. It will be understood that the film movement is synchronized with the deflection of the electron beam produced by the deflection plates 25.

FIGURE 15, which is a view taken along the line 15—15 of FIGURE 14, and FIGURE 16, which is a sectional view taken along line 16—16 of FIGURE 15, illustrate the details of construction of the high frequency heater for the thermoplastic tape. Referring to FIGURE 15, the heater assembly includes a stationary conducting support 201 which is bolted to and spaced from the bottom of the enclosure 30. The stationary member 201 is formed with an end portion providing a cylindrical segment 202 which provides one electrode or shoe of the high frequency heating system which is at ground potential. The member 201 is also provided with an axially extending recess for the reception of an insulating cylindrical sleeve 203 which is adjustably secured to a portion of the support 201 by means of set screw 204 extending through slot 203 to provide for the angular adjustment of the sleeve. A second electrode or shoe 205 in the form of a cylindrical segment is secured to this insulating sleeve so that it may be adjusted angularly relative to the electrode 202 to determine the width of the gap 206. A shaft 208 is non-rotatably fixed in the support at the center of curvature of the segments 201 and 205 and provided with ends which extend beyond the support to provide for the rotational mounting of the flanged pulleys 209 and 210 which are secured to the shaft 208 by screws 211. The faces of the pulleys 209 and 210 are of slightly larger diameter than the diameter of cylindrical segments 201 and 205 of the electrodes and in this way determines the width of the gap between the electrodes 202 and 205 and the thermoplastic surface 193 of the film as it passes over the pulleys 209 and 210. This gap is relatively small. It may, for example, be in the order of 4 mils. The lack of contact between the thermoplastic layer of the tape and the electrodes 202 and 205, however, avoids scratching of the film which might otherwise occur. This distance and the dimensions of the surfaces of the electrodes 202 and 205 and the thickness of the thermoplastic layer determine to a significant extent the capacity of the coupling between these electrodes and the conducting film 192. As illustrated in FIGURE 16 the electrical energy for the resistive heating of the film is provided by a high frequency oscillator 212 having one terminal connected to the stationary support 111 and, accordingly, to shoe 201 and the other terminal connected by a conductor to the other cylindrical electrode segment 205. An adjustable inductor 213 is connected across the output oscillator 212 to tune the system as a whole to the frequency of the oscillator output which may to advantage be a high frequency in the order of 50 megacycles.

In the operation of the system described in FIGURES 14–16, inclusive, and utilizing the three part composite tape described in connection with FIGURES 12 and 13 a charge pattern is established on the surface of the thermoplastic layer 193 by the electron beam emanating from the aperture 54 and impinging upon the thermoplastic medium as it passes a point opposite this aperture. The beam is controlled by the deflection plates 25 which may, for example, be energized by the color television signals of a color television receiver or directly from the output signals of the color television camera or described in connection with FIGURE 6.

In the recording of color television pictures the spacing between lines of charge is different for each color component and the charge density distribution varies along the lines of charge in accordance with the intensities of the respective color components. It is apparent that in the recording of monochrome television pictures the spacing between the lines of charge is uniform and the intensity information is applied to the medium in the variation in charge density along the lines of charge. In a broad sense the information to be recorded as applied to the thermoplastic material as a pattern of charge density distribution corresponding to the information to be recorded which may involve either or both a variation in charge density along the lines of charge and a variation in the spacing between the lines of charge.

As the tape passes over the high frequency heating unit 198, the thermoplastic layer 193 faces the spaced cylindrical electrode segments 201 and 202 which form the terminals of the high frequency supply and which are coupled to the conducting layer 192 of the tape by the capacity provided between the electrodes 201 and 205 on the one hand and the conducting layer 192 on the other. The thermoplastic surface only is raised to a temperature at which it is liquid by the electrostatic attraction of the charges on the surface thereof and the conducting layer 192 which provides a ground plane. The temperature at which the thermoplastic layer becomes sufficiently liquid to readily be deformed will vary with the composition and as stated earlier, preferably lies within the range of 60° C. to 150° C. As the tape passes over the guide pulley 199 and to the take-up reel 200, the tape cools, the relatively heavy base 191 forming a heat sink which rapidly cools the thin thermoplastic surface sufficiently to permanently retain the deformations produced by the electrostatic charge pattern.

The recording apparatus itself either as shown in FIGURE 14 or shown in FIGURE 1 may be materially simplified if the heating for the purpose of developing the deformations in the film is carried out after the film has been removed from the vacuum enclosure 30. Inasmuch as the resistivity of the film is very high, charges are retained for a long time and the development may accordingly be accomplished outside the vacuum without any strict time requirement. The development may take place, for example, when the film is run through a projector in which case hot, dry air or a hot inert gas, such as nitrogen, is directed onto the thermoplastic surface in sufficient volume and at a temperature sufficient to render the surface thereof sufficiently liquid to permit the charges to be attracted by the ground plane provided by the conducting layer 192 to form the deformations corresponding to the charge pattern.

The volume of hot gas and its temperature required to render the thermoplastic sufficiently liquid for development is readily determined. A 16 mm. tape having the information stored thereon in the form of an electric charge pattern has been developed when running through a conventional movie projector with modified optics by a blower and heater having an input of approximately 100 watts. The temperature of the hot air as it leaves the blower nozzle is several hundred degrees. The actual input to the tape is approximately 15 to 20 watts.

In the foregoing description reference has been made largely to a composite tape which is transparent and which includes at least a supporting layer and a thermoplastic layer and in a preferred form includes also an intermediate conducting film which serves as a ground plane and as a means for resistive heating of the thermoplastic film to permit development of deformations in accordance with the charge pattern established on its surface. It will be apparent to those skilled in the art that other forms of recording medium having a thermoplastic surface may be utilized and they may take the form of plates or drums, for example. Also, since the projection system for which the deformations are suited for use, such as those shown, for example, in my Patent 2,813,146, dated November 12, 1957, include reflection systems as well as transmission systems, it is to be understood that the base and conducting layer need not be transparent and that the conducting layer may be reflective for a reflection type projection system with a transparent layer of thermoplastic material on its surface. In such a combination the conducting layer may be made of aluminum or silver, for example.

In the foregoing specification a number of embodiments of my invention for recording information on thermoplastic material by thickness deformation of the material when in liquid condition in accordance with an electric charge pattern have been described. From this description it will be apparent that the heating may be accomplished in many different ways and may be accomplished either before or after the charge pattern is established. It is also believed clearly understood that the information may appear in the form of deformations which are superimposed diffraction gratings, for example, for color television or which may be merely depressions which refract the light when the tape is used to control the light emanating from it when placed in a projection system. The word diffraction alone as used in this specification and claims is utilized to describe the bending of the light which results from the deformation of the recording medium regardless of whether or not the projection system utilizes this bending of the light rays for color selection as it does in the specific case of color television, for example.

A number of different embodiments of the recording medium according to the invention including both two and three layer structures and including also flexible and rigid structures. The invention also contemplates transparent and reflection type mediums. It will be apparent that these features may be used in different combinations in accordance with the present invention.

It will be apparent to those skilled in the art that the illustrated embodiments of my invention are examples only and that many changes and modifications may be made without departing from my invention in this broader aspect and I aim, therefore, in the appended claims to cover all such changes and modifications as fall within the true spirit and scope of my invention.

What I claim as new and desire to secure by Letters Patent of the United States is:

1. A recording medium for recording information in the form of thickness deformations of a solid thermoplastic layer established in accordance with an electric charge pattern on one surface thereof, said medium comprising a base and a thermoplastic recording layer solid at room temperature carried by said base, said thermoplastic layer having a maximum thickness of about 15 microns and further having a resistivity above $3\times10^{10}$ ohm centimeters at a temperature at which the layer has a viscosity of about 4000 centipoises so that the electrostatic forces developed by the charge pattern on the surface thereof are effective to form thickness deformations in the thermoplastic surface when it is heated to a liquid state which are preserved when the thermoplastic is returned to a solid state.

2. A medium for recording information in the form of depressions formed in accordance with an electric charge pattern when said medium is heated to an elevated temperature, said medium comprising a thin recording film of thermoplastic material solid at room temperature having a maximum thickness of several mils and exhibiting chemical stability when scanned by an electron beam, a conducting layer in contact with said thermoplastic film layer on one side and a base on the other side of said conducting layer, said base being sufficiently thick that when the thermoplastic layer is heated by electrical energy coupled to said conducting layer the average temperature of said base layer is lower than the average temperature of said thermoplastic film layer whereby said base layer is a heat sink for cooling said thermoplastic film layer.

3. A recording medium for receiving depressions corresponding to information contained in an electric charge pattern on the surface of the medium when the surface is heated to a liquid state, said medium comprising a surface recording layer of thermoplastic material solid at room temperature having a maximum thickness of several mils, a conducting layer on one side of the layer of thermoplastic material and a layer of base material on the opposite side of said conducting layer, said base layer being substantially thicker than said thermoplastic layer so that said base layer provides a heat sink to cool the thermoplastic layer after the thermoplastic layer has been heated to a liquid state.

4. A medium for recording information as thickness deformations of a thin thermoplastic layer comprising a transparent base layer of several mils thickness, a thin transparent conductive film supported on said base and having a resistance in the order of 1000 ohms per square and a thermoplastic recording layer solid at room temperature in direct contact with said conducting film having a lower melting temperature than said base layer and having a maximum thickness much less than the thickness of said base layer so that said thermoplastic film may be heated to a liquid state without melting said base and said base provides a heat sink for cooling the thermoplastic film.

5. A recording medium for recording information in the form of thickness deformations capable of reproducing the information by bending of light impinging on the deformations comprising a recording layer of thermoplastic material solid at room temperature and having a maximum thickness of about 15 microns consisting essentially of polystyrene which is solid at room temperature and which may be rendered liquid by heating above 60° C.

6. A recording meduim for recording information in the form of closely spaced surface deformations of a thin solid thermoplastic layer capable of reproducing the information by bending of light impinging on the deformations comprising a support including a conducting surface and a thin recording layer of thermoplastic material which is solid and relatively undeformable at room temperature and possesses a high electrical resistivity so that a charge pattern corresponding to the information may be retained on the surface thereof while the material is heated to a relatively deformable liquid state to permit the deformation thereof, said layer having a maximum thickness of about 15 microns.

7. A composite medium having information recorded thereon as thickness a pattern of closely spaced thickness deformations which control projected light impinging on the medium to reproduce the information, said medium including a base and a thin recording layer of thermoplastic material solid at room temperature carried thereby and having a maximum thickness of about 15 microns, said thermoplastic layer only having a pattern of thickness deformations corresponding to the recorded information.

8. A composite tape for recording information in the form of thickness deformations of a solid thermoplastic layer comprising a flexible base layer, a thin conducting film carried by said base layer and a thin thermoplastic recording layer solid at room temperature on said conducting film, said thermoplastic layer being deformable in accordance with an electric charge pattern on the surface thereof by the electrostatic forces produced thereby in cooperation with said conducting layer when said thermoplastic layer is heated to a liquid state.

9. A composite tape for recording information as thickness deformations in a solid thermoplastic layer which control light projected through the tape to reproduce the information, said tape comprising a flexible base layer of transparent plastic material, a transparent thermoplastic recording layer of material solid at room temperature and having a resistivity in excess of $3 \times 10^{10}$ ohm centimeters at a temperature at which it is liquid and a maximum thickness substantially less than the thickness of the base layer and a thin transparent conducting layer between said base layer and said thermoplastic layer.

10. A composite tape for recording information in the form of thickness deformations of a solid thermoplastic layer which control light impinging thereon to reproduce the information comprising a flexible base including, a thin conductive film and a thermoplastic recording layer solid at room temperature on said conducting film, having a maximum thickness of about 15 microns, said layer having sufficient resistivity when heated to a liquid state to retain an electric charge pattern on the surface thereof corresponding to information to be stored to effect a corresponding pattern of thickness deformation of the thermoplastic layer by the electrostatic forces produced by the charge pattern and the conducting film as a ground plane when said layer is heated.

11. An article of manufacture comprising a solid body having a surface layer thereof formed of a thermoplastic material which is solid at room temperature and deformed in a pattern of thickness deformation corresponding to stored information which may be reproduced by bending of light rays impinging on the surface, said surface layer having a maximum thickness of about 15 microns, said pattern of deformation corresponding in configuration to a surface in force equilibrium between internal fluid forces when said surface is heated to a liquid state and forces developed by an electric charge pattern having a distribution corresponding to the stored information.

12. A storage tape comprising a transparent flexible base layer and a thermoplastic recording layer solid at room temperature and having a maximum thickness of about 15 microns, said thermoplastic layer having a pattern of thickness deformation formed therein corresponding to stored information which may be reproduced by bending of the light rays impinging on the surface, said pattern of deformation corresponding in configuration to the thermoplastic surface when melted and in force equilibrium between internal fluid forces and forces developed by an electric charge pattern acting on the surface and corresponding to the stored information.

References Cited in the file of this patent

UNITED STATES PATENTS

| | | |
|---|---|---|
| 2,391,451 | Fischer | Dec. 25, 1945 |
| 2,704,265 | Lyon | Mar. 15, 1955 |
| 2,748,288 | Saulnier | May 29, 1956 |
| 2,813,146 | Glenn | Nov. 12, 1957 |
| 2,858,181 | Ortlieb | Oct. 28, 1958 |

FOREIGN PATENTS

| | | |
|---|---|---|
| 384,258 | Great Britain | Dec. 22, 1932 |